Dec. 23, 1969  G. W. VAN CLEAVE  3,486,096
DRIVE CIRCUITS FOR STEPPING MOTOR INCLUDING
RAPID CURRENT BUILD-UP MEANS
Filed May 15, 1967

INVENTOR.
GEORGE W. VAN CLEAVE

BY Paul D. Carmichael

ATTORNEY.

United States Patent Office 3,486,096
Patented Dec. 23, 1969

3,486,096
DRIVE CIRCUITS FOR STEPPING MOTOR INCLUDING RAPID CURRENT BUILD-UP MEANS
George W. Van Cleave, Lexington, Ky., assignor to International Business Machines Corporation, Armonk, N.Y., a corporation of New York
Filed May 15, 1967, Ser. No. 638,553
Int. Cl. H02k 37/00; H02p 3/06
U.S. Cl. 318—138                                                    5 Claims

ABSTRACT OF THE DISCLOSURE

Drive circuits for stepping motors are each provided with at least one capacitor which is charged with the energy stored in the highly inductive windings of the stepping motor when the flow of current to the energized winding is terminated. The capacitor is connected in the circuit in such a manner that the energy stored therein discharges through the next selected or energized winding of the stepping motor. This substantially reduces the time required to switch the current between the windings and step the rotor of the motor. The circuits employ transistors which are used in the forward conducting mode to energize the windings of the stepping motor and in the reverse conducting mode to charge the capacitor. The transistors are switched while the voltages at their collectors are relatively low which minimizes damage to the transistors.

---

Figure 1:
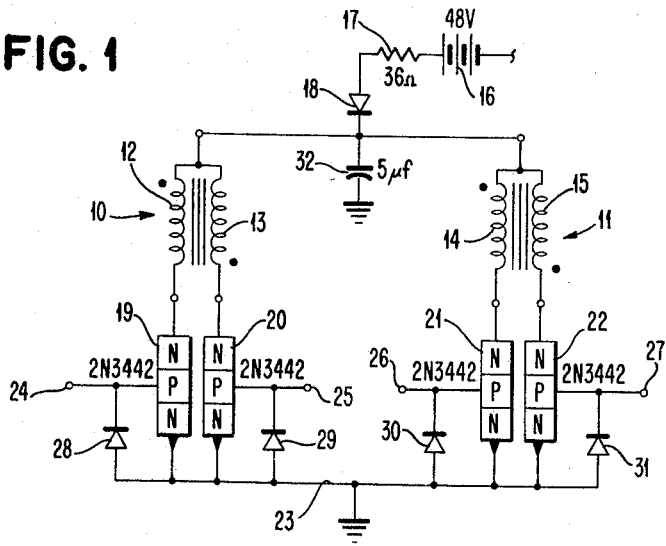

The present invention relates generally to drive circuits for selectively energizing highly inductive loads. In particular, the invention is concerned with providing drive circuits for stepping motors that permit substantial increases in the rates at which the rotors of the stepping motors can be indexed or stepped.

Within the last several years, there has been considerable interest in the use of synchronous inductor motors when energized with pulse type input signals to quickly and accurately move a driven member through a number of discrete intervals or steps. The synchronous inductor motor usually comprises a two phase stator winding and a permanent magnet rotor. The inner surface of the stator is built to provide a number of teeth which cooperate with a number of teeth on the adjacent outer surface of the rotor in defining magnetic circuit paths. The pitches of the teeth on the stator and rotor are slightly different so that the rotor can be made to advance in small angular steps by selectively energizing the stator windings. Such an arrangement is well known in the art at the present time and those desiring more information concerning the motor should refer to an article entitled "Characteristics of a Synchronous Inductor Motor" by Arthur E. Snowden and Elmer W. Madsen presented at the AIEE North Eastern District Meeting, Hartford Conn. on May 17–19, 1961 and available for printing on June 9, 1961.

When a stepping motor is employed to move a driven member to a number of discrete positions, the speed and accuracy of the positioning movements are usually quite important. The accuracy provided by stepping motors is normally quite high since the individual steps represent very small angular movements of the rotor. However, the speed of operation of stepping motors has been somewhat limited because the windings of a stepping motor represent highly inductive loads to the drive or energizing circuits. The windings have a certain time constant which limits the rate at which the current can be built up in the windings. Further, energy is stored in the windings during their energization which tends to resist any change from the steady state energized condition. The attempted surge of high voltage occurring when a winding is de-energized causes substantial problems in providing circuits for efficiently and quickly selecting and energizing the windings. For example, the individual components of the drive or energizing circuits must be capable of withstanding high voltage levels for sustained periods of time.

In view of the above, it is the primary or ultimate object of the invention to provide drive circuits for the rapid selection and energization of a plurality of highly inductive loads, such as the stator windings of a stepping motor. The drive circuits of this invention permit a stepping motor to be energized at a higher rate of speed than has heretofore been possible. In one constructed embodiment, the time required to move a driven member to a predetermined position by a stepping motor was reduced by a factor of three when a drive circuit of the type disclosed in this specification was employed.

Another object of the invention is the provision of drive circuits for highly inductive loads, such as the stator windings of a stepping motor, having an electrical energy storage means which receives and stores the energy surge which occurs when a winding is de-energized. The energy stored in this means is then used to assist in the rapid build-up of current in another winding. The inherent and usually objectionable energy surge occurring when a winding is de-energized is effectively utilized to very significantly increase the speed with which the rotor of a stepping motor can be indexed or stepped.

Another object of this invention is the provision of drive circuits for stepping motors wherein inherent protection is provided for the components thereof against the high voltage occurring when the highly inductive loads are de-energized or switched. Transistors are employed to control the flow of current to the windings and the operation of the circuits is such that any transistor is switched at a time when its collector voltage is very low. This avoids the possibility of secondary breakdown conditions and the necessity of additional protected protection means in the circuit, such as the use of more expensive components.

A further object of the present invention is to provide drive circuits for stepping motors capable of providing any desired mode of energization of the windings. In a single current mode of operation, only one winding is energized at a time while the double current operating mode contemplates the simultaneous energization of two electrically displaced but adjacent windings. The drive circuits are designed to accommodate single and double current operating modes as well as hybrid operating modes involving various combinations of single and double current energizations.

A still further object of the invention is the provision of drive circuits having the characteristics set forth above which are highly simplified in their construction and operation. The circuits are easily fabricated from conventional and relatively low cost components.

The foregoing and other objects, features and advantages of the invention will be apparent from the following more particular description of preferred embodiments, as illustrated in the accompanying drawings.

Figure 4:
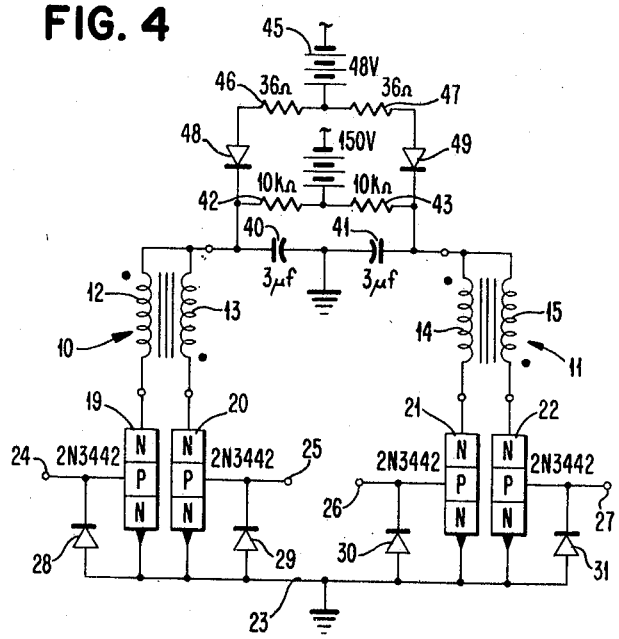
Figure 2:
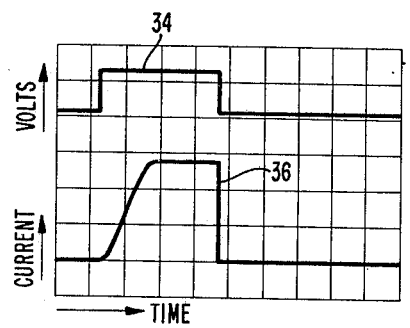
Figure 3:
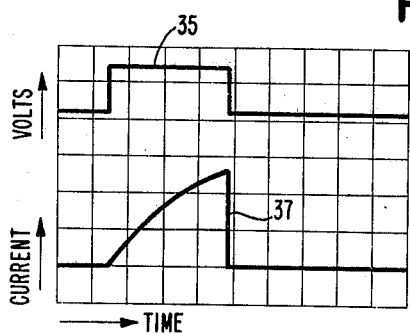

In the drawings:
FIGURE 1 is a schematic circuit diagram of a drive circuit embodying the teachings of the present invention which is particularly adapted for selecting and energizing the winding of a stepping motor in a single current mode;
FIGURES 2 and 3 are graphs showing the current build-up in a winding of a stepping motor in response to pulse energization when the circuit of FIGURE 1 is employed both with and without the storage capacitor; and
FIGURE 4 is a schematic circuit of a stepping motor drive circuit designed for double current and hybrid modes of operation.

Referring now to the drawings, and initially to FIGURE 1 thereof, the reference numerals 10 and 11 designate generally the center tapped coils of a stepping motor. These coils are wound on separate magnetic cores and provide four energizing windings 12–15. More information concerning the steppng motor itself is set forth in the above referenced Snowden and Madsen article. Other information is contained in Bulletin SS1163–1 relating to synchronous motors which was published and copyrighted in 1964 by The Superior Electric Company, 383 Middle St., Bristol, Conn. 06012. The structure of the stepping motor itself forms no part of this invention.

In the single current mode of operation, a winding of one of the coils is energized by a pulse followed by the energization of a winding of the other coil by another pulse. A typical energizing sequence for the four windings in the single current mode of operation would be 12, 14, 13, 15, 12, 14, 13, 15, etc. The energization of the windings in this sequence by pulse inputs permits the rotor and a member driven thereby to be indexed or stepped in an accurate manner.

A direct current voltage source 16 is connected via a current limiting resistor 17 and a diode 18 to the center taps of the coils 10 and 11. Connected in series with the windings 12–15 are the transistors 19–22, respectively, which serve as switches for controlling the energization of the windings. The transistors are of the NPN type and have their emitters grounded by common conductor 23. The collectors are connected to the ends of coils 10 and 11. Input terminals 24–27 are directly connected with the bases of the transistors 19–22 while diodes 28–31 are disposed between the base-emitter terminals of the transistors. The arrangement is such that whenever one of the transistors is rendered conductive in the forward direction in response to a switching signal applied to its base, a series circuit including source 16, resistor 17, diode 18, the selected winding and the conducting transistor is completed to energize the stepping motor. Circuit means, not shown, are provided for supplying pulse type selecting signals to the input terminals 24–27 to switch the transistors 19–22 in the desired sequence and energize the windings to drive the stepping motor in a single current mode of operation.

Disposed in series with the source 16, resistor 17 and diode 18 and in parallel with each of the four circuit portions comprising one of the windings 12–15 and its series connected associated transistor 19–22 is a capacitor 32. This capacitor serves as an energy storage means which absorbs the energy released when a coil is de-energized and stores this energy until the next winding is selected. The capacitor discharges through the newly selected winding and the current builds up very rapidly in this winding.

Considering the operation of the circuit, it will be assumed that transistor 19 is conducting so that winding 12 is energized with current flowing from source 16 through the winding 12 and transistor 19 to ground. Eventually the pulse at input terminal 24 terminates and the transistor 19 is rendered non-conductive in the forward direction. Due to the energy stored in the inductive winding 12, the voltage at the collector of transistor 19 tends to go positive. At the same time, the voltage at the collector of transistor 20 tends to go negative because of the coupling between the magnetically and inductively related windings 12 and 13. As the negative potential builds up at the collector of transistor 20, this transistor conducts in the reverse direction with the diode 29 providing a path for base current during reverse current conducting operation.

The reverse current conduction of the transistor 20 completes a charging path for the capacitor 32. This path can be traced from the positive side of winding 13, to capacitor 32, to ground, through conductor 23, through the reverse conducting transistor 20, and then to the negative side of winding 13. The arrangement is such that the energy stored in coil 10 is transferred to and stored in the capacitor 32 with the polarity indicated. The diode 18 is provided to prevent the discharge of the voltage on capacitor 32 through the source 16.

If the winding 14 is now energized by the application of a pulse to the base of transistor 21 to render the same conductive in the forward direction, the previously charged capacitor 32 discharges through the winding 14. This materially assists in the rapid build-up of current in the winding 14 and greatly improves the speed of operation of the stepping motor. When the voltage on the capacitor 32 is discharged to the value of the source 16, the winding will draw its sustaining current from the source. It is noted that the capacitor 32 is so connected in the circuit that it assists in the current build-up in each of the windings when the stepping motor is energized in the single current operating mode.

In a constructed embodiment of the invention, a "Slo-Syn" stepping motor marketed by Superior Electric Company under Model Number HS–50 was employed. This motor has a rating of 12 volts, 1 ampere for each of the windings. Representative values and types of the circuit components that may be used when operating this motor are indicated in FIGURE 1 of the drawings.

The graphs of FIGURES 2 and 3 of the drawings show oscillograph traces obtained for the circuit of FIGURE 1 of the drawings with the capacitor 32 operatively connected and removed from the circuit, respectively. The traces 34 and 35 depict voltage pulses applied to the base of the selected transistor 19–22. The traces 36 and 37 correspond to the current flowing in one of the motor windings 12–15 in response to conduction of its associated and series connected transistor. The scale on the graphs is that each horizontal division represents one millisecond while each vertical division for the current traces 36 and 37 is equal to approximately one quarter of an ampere. The voltage pulses applied to the bases of the transistors had values of about eight tenths of a volt. It is apparent from the graphs that the current build-up in the selected and energized winding is much faster when the capacitor 32 is operatively connected in the circuit (FIGURE 2 of the drawings) and discharges the stored energy through this selected winding.

Another important advantage of the present circuit is that it permits the transistors 19–22 to be completely switched when their collector voltages are quite low. In the operating example set forth above, the transistors 19 and 20 will switch at something less than twenty volts when a selected winding 12 is de-energized. While the voltage on the capacitor 32 may reach several hundred volts after the transistors have fully switched, the overall effect is to substantially eliminate the possibility of transient conditions which could cause failure of the transistors. A possible requirement for more expensive components and/or overload protection means is avoided.

The circuit shown in FIGURE 4 of the drawings is designed for use where the stepping motor is actuated in a double current or hybrid mode. To avoid unnecessary repetition in the specification, similar components are designated by the same reference numerals in FIGURES 1 and 4 of the drawing and only the differences in the circuits will be described in detail.

A pair of capacitors 40 and 41 are connected in series between the center taps of the coils 10 and 11. A grounding connection is provided between the capacitors 40 and 41. Disposed in parallel with the capacitors 40 and 41 are resistors 42 and 43 whose adjacent ends are referenced to a high voltage direct current source 44. The main source for the windings 12–15 is provided by direct current voltage source 45 which is connected between resistors 46 and 47. A pair of diodes 48 and 49 interconnect the opposite ends of these resistors 46 and 47 with the center taps of the coils 10 and 11.

In the double current mode of operation, two of the windings are energized simultaneously. For example, an energizing sequence might be windings 12 and 14, 14 and 13, 13 and 15, 15 and 12, 12 and 14, etc. A winding of one of the coils remains energized while the current is switched between the windings on the other coil in this mode of operation. The coils 10 and 11 are effectively isolated from each other in the sense that the switching takes place between the windings of the same coil. Therefore, it is necessary to provide a separate capacitor and energizing circuit for each of the two coils. However, the principles of operation are exactly the same as those outlined above relative to the circuit of FIGURE 1 of the drawings.

The resistors 42 and 43 and source 44 define a means for maintaining a charge on the capacitors 40 and 41 when it is desired to actuate the stepping motor in a double current mode to rotate the rotor and a single current mode to hold the rotor in a predetermined position. For example, it may be desirable to hold the motor for an extended period of time in a single current mode with current flowing through winding 14 and then switch to a double current mode with initial energization of windings 13 and 15 to move the rotor. The voltage source 44 maintains the charge on the capacitor 40 or 41 which otherwise would leak to ground during periods when the rotor is held in one position for an extended period to time with only one of the windings energized.

It should now be apparent that the objects initially set forth have been accomplished. Of particular significance is the use of an energy storage device which receives the energy stored in the winding of a stepping motor winding when the winding is de-energized and then discharges this energy through the next selected winding. The overall arrangement is such that the current build-up in the windings and the overall speed of operation of the stepping motor are greatly enhanced.

While the invention has been particularly shown and described with reference to preferred embodiments thereof, it will be understood by those skilled in the art that various changes in the form and details may be made therein without departing from the spirit and scope of the invention.

What is claimed is:

1. A drive circuit for energizing a stepping motor having a plurality of inductively coupled and selectively energizable windings comprising:
   a source of voltage for supplying energizing current to said inductively coupled windings;
   an actuatable switch means connected in series with each of said windings to define a plurality of energizing circuits;
   circuit means connecting each of said energizing circuits with said source of voltage and in parallel relation to each other;
   means to selectively actuate said switch means to cause selective energization of said windings;
   an energy storage device connected in parallel relation with said energizing circuits;
   said energy storage device receiving and storing the energy inductively coupled through one of said inductively coupled windings when another of said inductively coupled windings is de-energized; and
   said energy storage device discharging through the next selected energizing circuit in parallel therewith to cause rapid current buildup in the next selected winding.

2. A drive circuit according to claim 1 further comprising a source of energy for maintaining a predetermined energy level in said energy storage device.

3. A drive circuit for energizing a stepping motor comprising a pair of coils, each coil having a pair of inductively coupled and selectively energizable windings comprising:
   a source of voltage for supplying energizing current to said windings;
   an actuatable switch means connected in series with each of said windings to define a plurality of energizing circuits;
   circuit means connecting each of said energizing circuits with said source of voltage and in parallel relation to each other;
   means to selectively actuate said switch means to cause selective energization of said windings;
   a pair of energy storage devices, each energy storage device being connected in parallel relation with the energizing circuits of one of said pair of coils; and
   said energy storage devices each receiving and storing the energy coupled through one of said inductively coupled windings of the associated coil when the other of said inductively coupled windings of said associated coil is de-energized and discharging through the next selected energizing circuit to cause rapid build up of the current in the next selected winding.

4. Apparatus according to claim 3 further comprising a source of energy for maintaining a predetermined energy level in said energy storage devices.

5. A drive circuit according to claim 1 wherein:
   each of said actuatable switch means comprises a transistor connected in series with one of said winding;
   said transistor conducting in one direction when selectively actuated to cause selective energization of said series connected winding; and
   said transistor conducting in the reverse direction when the winding inductively coupled to said series connected winding is de-energized.

References Cited

UNITED STATES PATENTS 3,402,334  9/1968  Newton _____ 318—138

G. R. SIMMONS, Primary Examiner

U.S. Cl. X.R.

307—268